Figure 5:
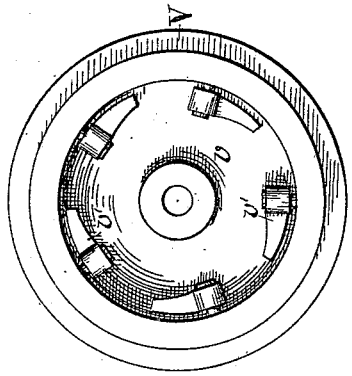

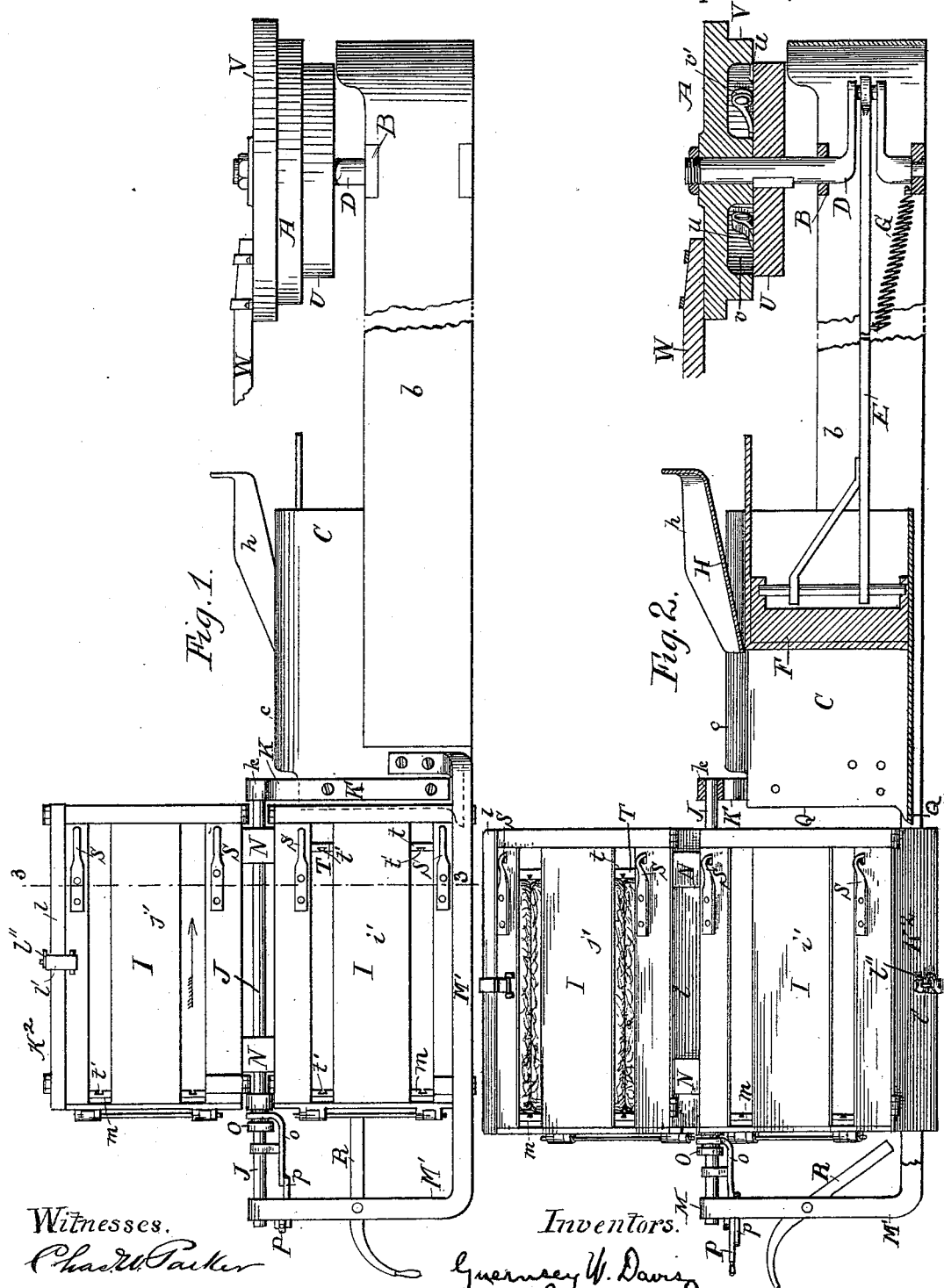

(No Model.)  2 Sheets—Sheet 2.

G. W. & G. A. DAVIS.
BALING PRESS.

No. 525,841. Patented Sept. 11, 1894.

Witnesses.
Chas. H. Parker
J. S. Parker.

Inventors.
Guernsey W. Davis
and George A. Davis
by Charles H. Burt B. King,
Attorneys

UNITED STATES PATENT OFFICE.

GUERNSEY W. DAVIS AND GEORGE A. DAVIS, OF FAIRFIELD, ARKANSAS.

BALING-PRESS.

SPECIFICATION forming part of Letters Patent No. 525,841, dated September 11, 1894.

Application filed April 19, 1893. Serial No. 471,047. (No model.)

*To all whom it may concern:*

Be it known that we, GUERNSEY W. DAVIS and GEORGE A. DAVIS, citizens of the United States, residing at Fairfield, in the county of Jefferson and State of Arkansas, have invented certain new and useful Improvements in Baling-Presses; and we do hereby declare the following to be a full, clear, and exact description of the invention, such as will enable others skilled in the art to which it appertains to make and use the same.

Our invention relates to presses, particularly to presses intended for baling hay; although certain features of our invention can be used upon presses intended for other purposes.

Our invention has for its object to produce a machine whereby the baling can be done rapidly, and with the least possible expenditure of power and labor.

Heretofore, in order to secure speed in baling, it has been customary to use what are known as continuous baling presses, that is to say, the baling chamber was elongated so that it would contain two or more bales, arranged end to end and separated by blocks. In the use of a baling press of this character the hay is fed continuously into the bale chamber, and when a sufficient amount for a bale has been introduced a separating block is fed into the chamber, and the bale which has been formed and is near the discharge end of the chamber is wired while the next bale is being formed. This process permits the continuous forming of bales and their wiring at the same time, but it is objectionable in that it requires an excessive expenditure of power in order to force the several bales in the chamber through the same. It also requires constant attention on the part of the operator to the tension devices as more or less tension is required on the bales according to the condition of the hay.

By the use of our invention we secure the advantages incident to the continuous baling presses, in that the feeding and tying or wiring operations are carried on simultaneously and we accomplish this with a greatly reduced expenditure of power required to compress the bale. To this end we make the bale chamber of a size to receive but a single bale which is compressed against the rigid head of the chamber and the chamber is mounted upon a shaft so it can be turned into position to be filled by the plunger and then into position to have the bale wired. In combination with the movable bale chamber already described we arrange another bale chamber which is brought into position to be filled when the other chamber is carried away to have the bale wired.

Our invention consists of a press having the various novel features of construction and novel combinations of parts to be hereinafter pointed out.

In the drawings accompanying this specification we have illustrated the preferred form of our invention.

Figure 4:
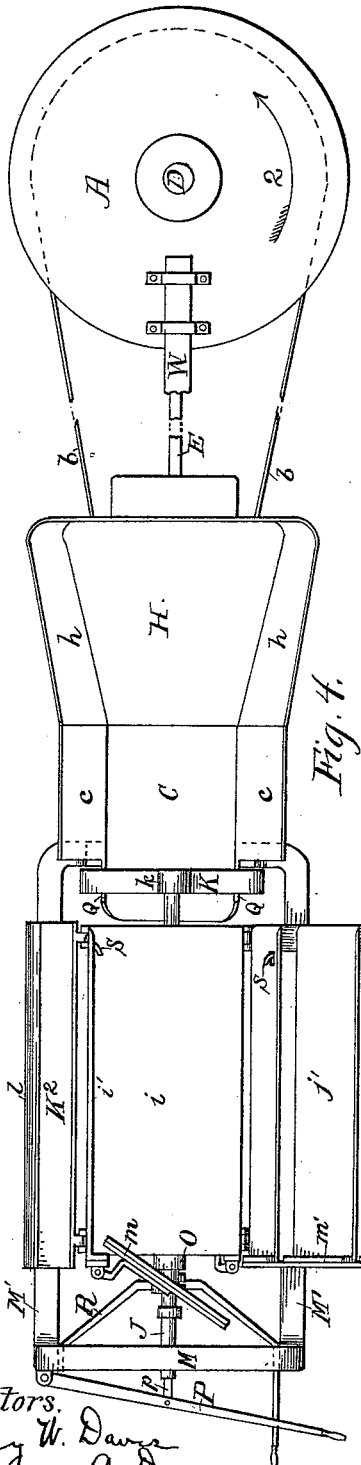
Figure 3:
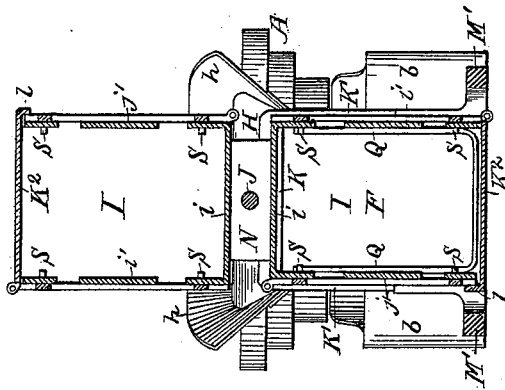

Figure 1 is a side view of a baling press embodying our invention. Fig. 2 is a side view, partly in section showing some of the parts in a different position from that which they occupy in Fig. 1. Fig. 3 is a vertical section on the line 3, 3 Fig. 1 looking in the direction indicated by the arrow. Fig. 4 is a plan view showing the upper bale chamber or box open. Fig. 5 is an inverted plan view of the upper member of the horse power.

In the said drawings A designates a horse power mounted in a suitable frame B, the side pieces, $b$, of which are secured to the plunger, or feed chamber C.

D is the crank shaft operated by the horse power and connected with the plunger F by the pitman E.

G is a spring connecting the pitman with some stationary part of the frame, and serving to retract the plunger in a well known manner.

The parts thus far described may be of any usual or preferred construction, although we prefer that the horse power shall be constructed in the manner in which we shall presently describe.

The bale chamber or receptacle, is arranged directly in line with the feed chamber or hopper C, and we prefer that the upper end of such chamber, C, should be open, and that its side walls should flare outward as shown at $c$.

H is a feed plate preferably inclined as shown, and covering the rear part of the feed or plunger chamber C, so that when the plunger is retracted it lies underneath this plate. We prefer that the edges $h$, of the feed plate should be turned upward to prevent scattering of the hay. When the feed chamber is constructed as described the operator can easily fill the bale chamber with his fork so that it is only necessary to use the plunger when it is desired to compress the hay within the bale chamber, whereas in most presses the plunger has to be operated continuously as the feed chamber is not of such construction as to permit the operator to easily feed the hay therefrom into the bale chamber with his fork. We employ two bale chambers or boxes, I, I, which are arranged side by side and mounted upon a horizontal shaft J upon which they can be turned so as to bring one or the other of them opposite to the end of the feeding or plunger chamber C. The inner end of the shaft J, is mounted in a bearing $k$ carried by the cross piece K, extending across the top of the feed chamber C at its inner end. The cross piece K is preferably formed in one piece with the strengthening ribs, K′, secured to the outer faces of the side pieces of the feed chamber. The outer end of the shaft J is mounted in a cross piece M of the frame, which, in turn, is connected with some stationary part of the press, such as the feed chamber C, by the angular frame pieces M′. The shaft J passes through blocks N, N, arranged between the bale boxes and to which they are secured. The boxes, I, in which the bales are formed are free to be turned upon their supporting shaft J, so that when a bale has been formed in one of them the position of the boxes is reversed, and the one in which the bale is formed is carried above the shaft, where it can be wired, while the other bale chamber or box which was carried opposite to the end of the feeding chamber is being filled. We have found that it is desirable to move the bale chambers away from the end of the feeding chamber before they are turned, and to that end the bale chambers are free to be moved longitudinally upon the shaft J to a limited extent.

O is a grooved collar mounted upon the shaft J and connected with the rear end of the bale chambers, and $o$ is a shifting bar engaging with the groove in such collar.

P is a shifting lever pivoted to one of the frame pieces M′, and connected with the shifting bar $o$ by a link $p$.

In order to hold the bale chamber being filled properly in line with the feed or plunger chamber we so construct the machine that these two chambers come together with a telescopic action.

Q is a projecting rim at the forward end of the feed chamber extending beyond the ribs K′. This rim fits into the open end of the bale chamber when the latter is slid up into place and operates to hold the bale chamber from turning and in line with the plunger chamber while the bale is being formed. The ribs, K′, K′, constitute stops or abutments against which the forward ends of the bale chambers bear, and they, in conjunction with the rim C determine the proper position of the bale chamber while being filled. The lower horizontal portion of the rim Q extends out somewhat in advance of the side portions of the rim, and has its edges beveled so it will serve to guide the bale chamber into proper position relative to the chamber C.

R is a swinging brace pivoted between the frame pieces M′ and adapted to be swung against the rear end of the bale chamber when it is opposite to the plunger chamber C and to constitute a rigid brace or abutment therefor. This brace takes the strain, incident to the operation of the plunger, off from the rear end of the bale chamber to a very considerable extent, thus permitting the use of a comparatively light bale chamber, and increasing the durability of the machine. The brace also serves to lock the bale chamber in position to be filled.

S, S, are spring actuated hooks which project a short distance into the bale chamber from its opposite sides and serve to engage with and retain the hay as it is fed into the chamber. After the last charge of hay is fed into the bale chamber a follower block T is introduced. The edges, $t$, of this block are constituted so that the hooks will engage therewith; and its inner face is provided with grooves $t'$ through which the binding wires can be passed. After the bale is completed and the follower block T has been introduced, the bale chambers are turned so as to carry the filled one above the shaft where it is wired. In order to facilitate the removal of the bale from the chamber in which it was formed after it has been properly wired or tied, we construct the bale boxes or chambers so that they can be opened.

Each bale box or chamber is preferably constructed as follows:—$i$ is the bottom of the bale chamber, that is to say, it is that wall which is adjacent to the shaft J and serves as the bottom of the chamber when in its uppermost position. It is supported upon the blocks N, N, the walls $i$ of the two chambers being secured to the opposite faces of these blocks with the shaft J between them. $i'$ is one of the sides of the bale box and $j'$ the opposite side. One of these sides, $i'$, is rigidly secured to the bottom $i$, and the other is hinged thereto, so that it may be swung outward as shown in Fig. 4. $K^2$ is the top of the chamber, that is, that wall which lies opposite to the wall $i$. It is hinged to the stationary or rigid side $i'$, and has its edge $l$ flanged so as to lap over the outer or upper end of the swinging side and thereby hold it in proper position when the chamber is closed. The cover or top $K^2$, of the bale chamber is held down by a hasp $l'$ carried by the swinging side $j'$, and a hook $l''$. In addition to making one side of the top of the bale chamber movable as just described we prefer to hinge the rear end thereof, $m$, also. We prefer that the end of the bale chamber should be hinged to the rigid side thereof $i'$, but it could be hinged to the bottom, $i$, if thought desirable. $m'$ is a flange or rib carried by the swinging side $j'$ of the bale box and adapted to overlie the free edge of the end, $m$, and thus hold it in place when the chamber is closed. By reference to Fig. 3 it will be observed that the cross piece K is below the wall $i$ of the bale chamber, and that the lower rim Q is above the wall $K^2$ of the chamber. This arrangement insures the folding in of the straw at the top and bottom of the bale, as each successive charge is introduced into the chamber by the plunger, thus improving the appearance of the bale to a very considerable extent.

We will now proceed to describe the form of horse power which we prefer to employ. U is a plate or disk of metal secured to the crank shaft D and provided on its upper surface with a series of ratchet teeth $w$. V is a plate mounted loosely upon the shaft D and resting upon the ratchet plate U. It is provided on its under surface with an annular recess $v$ in which are mounted a number of pawls $v'$ adapted to engage with the ratchet teeth $u$ when the plate V moves in one direction, but to ride over such teeth when it moves in the opposite direction. W is the sweep secured to the plate V and by which power is applied thereto. When the upper plate of the horse power is turned in the direction of the arrow 2 Fig. 4, the pawls $v'$ engage with the ratchet teeth and carry the lower plate U, and the crank shaft D, therewith until the plunger reaches its extreme forward position and the crank passes the dead-center point. As soon as this occurs the spring G, which is then under tension, suddenly retracts the plunger, causing the crank shaft, and the plate U, to run ahead of the upper plate V for about a half revolution. The ratchet and pawl connection between the two members of the horse power permits this independent forward motion of the under plate U, but prevents any independent motion in the opposite direction, so that as soon as the plate U ceases to move under the influence of the spring G, it is caught by the pawls and carried forward with the plate V. This gives about two strokes of the plunger to each revolution of the plate to which the sweep is attached without increasing the power required to run the press to any material extent.

The various parts of our press may be constructed of any suitable material, iron and steel being the materials employed for most of the parts.

The press is preferably provided with shafts or trunnions, or other means of supporting it upon wheels so that it can be easily transported from place to place.

When the machine is in operation the frame pieces $b$ and $m'$ rest directly upon the ground or flooring on which the machine is supported, so that the parts of the apparatus are brought low down and in the most convenient position for being operated. The feed or plunger chamber is, as hereinbefore described open at the top, and being not more than two feet high it is an easy matter to fill the bale chamber with loose hay by the use of a fork. While this is being done the animal which operates the horse power can rest. In this respect our invention is an improvement over machines of that class in which the hay can be fed into the bale chamber only by means of the plunger, which requires a constant operation thereof.

The height of the top of the upper bale box or chamber is about forty inches which brings the bale at a convenient height to be wired by a person standing at one side of the press.

The reasons for making the rear end of the bale chamber so that it can be swung out are, first, to permit the attendant to easily grasp the bale at both ends; and secondly, to relieve the bale from tension simultaneously at both ends. If this were not done the expansion of the bale would throw the follower block with considerable force and to such distance from the machine as is undesirable. By making the bale chamber as we have described the follower block is thrown out close to the feeder and with but little force.

A horse power of the character described increases the number of reciprocations imparted to the plunger as compared with a horse power in which the sweep has a rigid connection with the crank shaft. This advantage is secured without any considerable increase in the power required to drive the plunger. Another advantage incident to the construction of the horse power as we have described is that it insures the retraction of the plunger should it tend to stick to such an extent that the spring cannot start it back.

Having thus described our invention, what we claim, and desire to secure by Letters Patent, is—

1. In a baling press, the combination of the feeding chamber, the plunger which works therein, the bale box mounted upon a horizontal shaft upon which it can be turned and also move longitudinally to a limited extent, and means for sliding the bale box away from the feeding chamber, substantially as set forth.

2. In a baling press, the combination of the feeding chamber, the reciprocating plunger, the two baling chambers mounted side by side and supported upon a horizontal shaft on which they are free to turn, and also to slide to a limited extent, and the means for sliding the bale boxes away from the feeding chamber, substantially as set forth.

3. The combination of the feeding chamber, the plunger working therein, a bale box or chamber mounted on a shaft on which it can be turned, and also slid to bring it against the end of the feed chamber, the feed chamber and bale chamber being constructed to come together telescopically, and means for sliding the bale chamber toward and from the feed chamber, substantially as set forth.

4. In a baling press, the combination of the feeding or plunger chamber having its forward end provided with the projecting rim Q, the reciprocating plunger, a bale chamber mounted on a shaft in line with the feeding chamber, upon which shaft it can be slid to a limited extent, the said rim at the end of the feeding chamber being arranged to fit into the end of the bale chamber, and a stop or abutment which limits the extent of the sliding movement of the bale chamber, substantially as set forth.

5. In a baling press, the combination of a bale chamber mounted upon a shaft upon which it can be turned, and upon which also it can be moved longitudinally to a limited extent, a plunger to compress the material fed into the bale chamber, and a movable brace adapted to be brought into engagement with the end of the bale chamber when the latter is moved into line with the plunger, substantially as set forth.

6. In a baling press, the combination of a feeding chamber, the plunger, a bale chamber mounted on a shaft on which it is free to be turned so that it can be brought into line with the feeding chamber and a swinging brace mounted in the frame work of the machine, and adapted to be moved against the rear end of the bale chamber when it is brought into line with the feeding chamber, substantially as set forth.

7. The combination of the feeding chamber, plunger the two bale boxes or chambers I, I, mounted side by side and supported upon a shaft J on which they can be turned so as to bring one or the other of them into line with the feeding chamber the said bale chambers being also free to be slid upon the shaft, a shifting lever and connections with the bale chambers for sliding them upon the shaft, and a movable brace adapted to be moved against the end of the bale chamber opposite the feeding chamber, when it is slid close thereto, substantially as set forth.

8. The combination of the feeding chamber C open at the top and having the cross piece K extending across its upper forward end, the plunger, and the movable bale chamber in line with the feeding chamber the cross piece K, having its lower edge below the top wall of the bale chamber, whereby to fold in the ends of the hay, or other material being baled, substantially as set forth.

In testimony whereof we affix our signatures in presence of two witnesses.

GUERNSEY W. DAVIS.
GEORGE A. DAVIS.

Witnesses:
R. S. THOMPSON,
D. L. FRANKLIN.